United States Patent [19]

Bailly et al.

[11] Patent Number: 4,682,355
[45] Date of Patent: Jul. 21, 1987

[54] ELECTRONIC FEEDING BRIDGE FOR A SPACE DIVISION SWITCHING NETWORK

[75] Inventors: François P. Bailly, Palaiseau; Alain Bourgoin, Dourdan, both of France

[73] Assignee: Societe Anonyme de Telecommunications, Paris, France

[21] Appl. No.: 650,181

[22] Filed: Sep. 13, 1984

[30] Foreign Application Priority Data

Sep. 15, 1983 [FR] France ................. 83 14693

[51] Int. Cl.⁴ ............................................. H04B 3/16
[52] U.S. Cl. ................... 379/346; 379/398; 379/413
[58] Field of Search ............. 179/16 A, 16 AA, 16 F, 179/18 F, 18 FA, 70, 77, 170 G; 323/356, 357; 379/324, 340, 346, 398, 400, 413

[56] References Cited

U.S. PATENT DOCUMENTS

| | | | |
|---|---|---|---|
| 3,548,109 | 12/1970 | Schnurr | 179/16 A |
| 3,562,561 | 2/1971 | Klosterman | 179/70 |
| 3,627,952 | 12/1971 | Person | 179/16 F |
| 3,987,375 | 10/1976 | May et al. | 333/24 R |
| 4,197,431 | 4/1980 | Vis | 179/70 |
| 4,532,384 | 7/1985 | Keriakos et al. | 179/77 |

FOREIGN PATENT DOCUMENTS 2042848 9/1980 United Kingdom ............... 179/70

OTHER PUBLICATIONS

M. Ferry, D. Reynes, J. Suzzoni; "Adjustable Resistance Circuit"; IBM Technical Disclosure Bulletin; vol. 22, No. 11; Apr. 1980; p. 4955.

Primary Examiner—Gene Z. Rubinson
Assistant Examiner—Randall P. Myers
Attorney, Agent, or Firm—Holman & Stern

[57] ABSTRACT

The invention relates to a telephone subscriber electronic feeding bridge which includes a transformer with three windings, between the line of the sub set and the connection network of the telephone unit automatic exchange or autoswitch of which it forms a part. A capacitor is interposed on one of the two wires of the line, connected furthermore to feed resistors. The third winding of the transformer, associated with the winding of the line of the set, is looped on a negative impedance. This arrangement allows impedance matching both in direct current and in alternating current.

4 Claims, 4 Drawing Figures

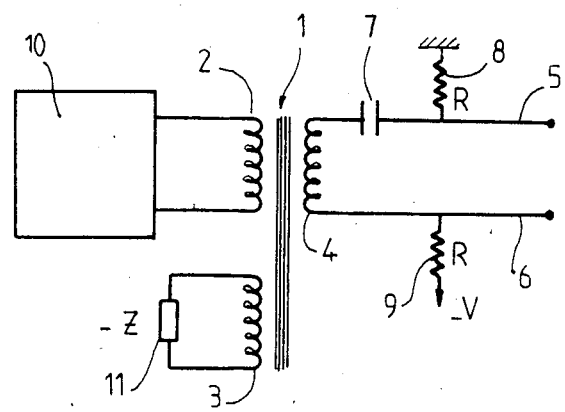
FIG.1
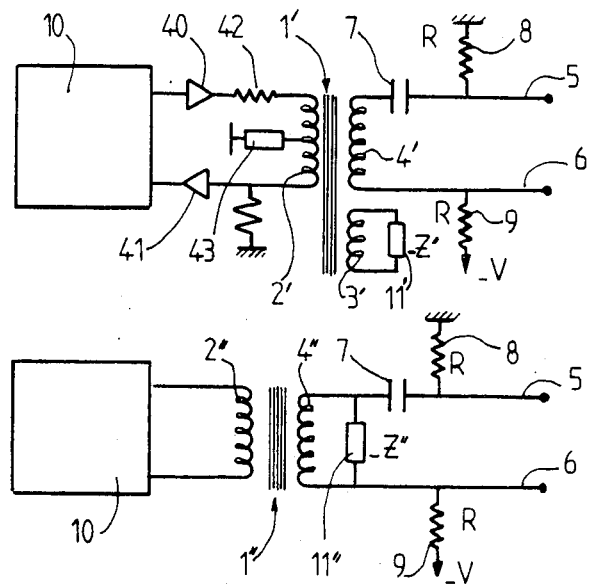
FIG. 2
FIG. 3
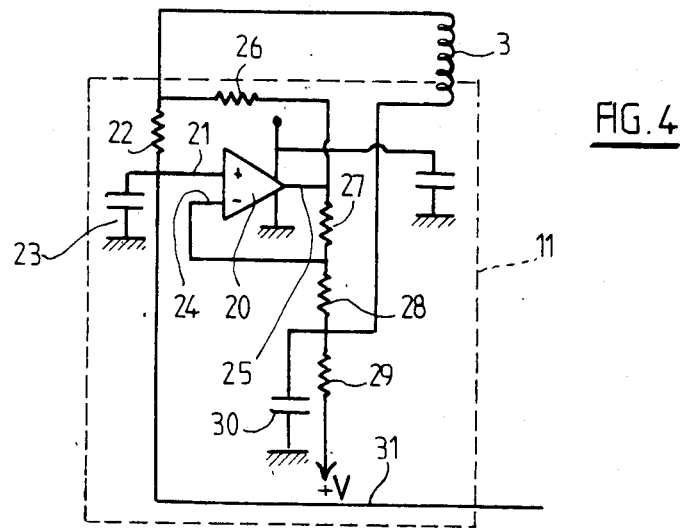
FIG.4

ELECTRONIC FEEDING BRIDGE FOR A SPACE DIVISION SWITCHING NETWORK

The present invention relates to a electronic feeding bridge for a space division switching network; (referred to hereafter for brevity as a "telephone subscriber junctor").

An electronic feeding bridge is a peripheral unit of a unit automatic exchange or autoswitch, corresponding to a sub set, adapted to be linked either to another electronic feeding bridge, or to a network line junctor, via a switching network. In a unit automatic exchange, there are as many electronic feeding bridges as there are sub sets linked to said exchange.

An electronic feeding bridge has already been proposed, comprising a pair of two wires adapted to be linked, on the one hand, to a sub set, on the other hand, to the two ends of a first winding of a transformer via at least one capacitor connected between one of the ends of said first winding and the associated wire of said pair, the transformer comprising a second winding linked to a switching network, and the two wires of said pair being respectively linked to two feed resistors, one taken to earth, the other to a feed potential.

It is true that such an arrangement, with a transformer of acceptable dimensions, presents the advantage of making a galvanic insulation between the electronic feeding bridge and the switching network.

Nevertheless, the following remark should be made.

In direct current, the sub set is connected in series with the two resistors which therefore perform the role of feed resistors.

In alternating current, the two so-called feed resistors, in series, are connected in parallel on the line or the pair of wires of the sub set.

Now, there may be advantage in the value of the resistors, preferably the same for the two for reasons of balance, as D.C. feed resistors, not being too high.

In that case, in alternating current, they present too low a parallel impedance for the impedance matching with the sub set to be effected, since it is even advantageous, in alternating current, if this feed impedance is as high as possible.

In other words, the problem may be encountered of having a sum of the values of the two resistors, in direct current, less than a first terminal, and, in alternating current, greater than a second terminal, whilst the value of the second terminal is greater than that of the first terminal.

This is a major drawback of the arrangement mentioned hereinabove, and it is therefore an object of the present invention to solve this problem of impedance matching, in direct current and in alternating current.

SUMMARY OF THE INVENTION

To this end, the present invention relates to an electronic feeding network of the type mentioned above, characterized in that it comprises means adapted to cooperate, in alternating current, with the feed resistors and thus to present in parallel on said pair of wires, towards the sub set with respect to the capacitor, an impedance greater than that of the two feed resistors connected in series.

Thanks to the invention, it is therefore easy to propose a determined D.C. feed impedance less than a desired value depending on the impedance of the sub set, and a parallel A.C. impedance greater, or considerably greater than this feed impedance, even infinite, enabling the sub set to be switching directly on the connection network, by a pair of wires virtually insulated from each other, the capacitor for its part acting as a short-circuit, especially at high frequencies.

In other words, a perfect impedance matching is effected thanks to the invention.

In the preferred embodiments of the junctor of the invention, the means of cooperation with the feed resistors comprise at least one negative impedance.

In one case, it may be connected in a germinated circuit comprising a third winding of the transformer.

In another case, it may be connected in parallel on the wires of the sub set, on one side or the other of the capacitor.

BRIEF DESCRIPTION OF THE DRAWINGS

The invention will be more readily understood on reading the following description with reference to the accompanying drawings, in which:

FIG. 1 shows a first schematic embodiment of the electronic feeding bridge of the invention.

FIG. 2 shows a second schematic embodiment of the electronic feeding bridge of the invention.

FIG. 3 shows a third schematic embodiment of the electronic feeding bridge of the invention, and FIG. 4 shows the preferred embodiment of the negative impedance of the electronic feeding bridge of the invention.

DETAILED DESCRIPTION OF A PREFERRED EMBODIMENT OF THE INVENTION

Referring now to the drawings, and firstly to FIG. 1, and excluding the other elements of the electronic feeding bridge of the invention which do not concern the invention itself, such as for example the data processing components, the electronic feeding bridge comprises a transformer 1 with three windings 2, 3, 4, associated magnetically in two pairs 2, 4 and 3, 4. The first winding 4, on the sub set side, is connected to a pair of two wires 5, 6 adapted to be connected to the sub set, with interposition of a capacitor 7 between the wire 5 and the associated end of the winding 4. The two wires 5, 6 are connected respectively to two resistors 8, 9, of the same value R for obvious reasons of balance, one, 8, being taken to earth, the other, 9, to a feed potential, negative in the present case, $-V$.

The second winding 2 of the transformer is switching to a connection network 10, which is well known, of the telephone unit automatic exchange or autoswitch of which the electronic feeding bridge in question constitutes one of the peripheral units.

The third winding 3 of the transformer, associated, like winding 2, with winding 4, is looped on a negative impedance 11, of value $-Z$.

In direct current, the sub set connected to the pair of wires 5, 6 is in series with the two resistors 8, 9, because of the capacitor 7. In this case, the feed resistance of the set is 2R.

In alternating current, and employing the well known theory of the transformer, and therefore adding the impedance 11 on the sub set side, the sub set sees a positive impedance 2R in parallel on line 5, 6, as the two resistors 8, 9 are in series, and a negative impedance $-Za^2$, a being the ratio of transformation of the part of transformer 3, 4. The two impedances 2R and $-Za^2$, in parallel on line 5, 6, cooperate to some extent to form an equivalent impedance in parallel on the line of a value of $$\frac{2RZa^2}{Za^2 - 2R}.$$

greater than 2R.

Thus, at low frequencies, or in direct current, the sub set is connected on a feed resistor 2R, whilst at audio frequencies, the capacitor 7 behaving virtually as a short-circuit, it is connected on a parallel impedance $$\frac{2RZa^2}{Za^2 - 2R}.$$

If $Za^2$ is taken to be equal to 2R, at audio frequencies the equivalent impedance is infinite.

It will therefore be appreciated that, thanks to the existence of the negative impedance 11, it is possible to choose a suitable value for the feed resistors, to determine the value of the negative impedance thereof, and to have a very high or infinite impedance at audio frequencies.

The other two embodiments of the electronic feeding bridge of the invention do not basically differ from the one which has just been described. Consequently, the same references will be used for designating the same elements.

In the embodiment of FIG. 2, the transformer 1' comprises three windings 2'-4', respectively looped on the switching network 10, the negative impedance 11'(−Z') and on the sub set. The winding 2', at centre point, is linked to the switching network 10 at one end, by an emission amplifier 40 and an impedance 42 in series, and, at the other end, by a reception amplifier 41. A balancing impedance 43 is connected at the centre point of the winding 2'. The value of the negative impedance 11'will preferably be such that $Z'a'^2=2R$, $a'$ being the transformation ratio of the transformer part 3', 4'. This assembly is particularly adapted for time-division unit automatic exchanges.

In the embodiment of FIG. 3, the transformer 1" comprises only two windings 2", 4" and the negative impedance 11" is directly connected to the terminals of the winding 4", furthermore looped on the sub set by the capacitor 7. Being directly connected on the side of winding 4" linked to the sub set, the value of the impedance 11"will preferably be $Z" = 2R$.

Of course, the scope of the invention would not be exceeded by providing, instead of two feed resistors 8, 9, one single feed resistor, but to the detriment of the balance of the feed bridge, instead of one capacitor 7, two capacitors respectively connected to the two wires 5, 6, and, instead of one single negative impedance, as in the case of FIG. 3, two negative impedances respectively connected to the two wires 5, 6, like resistors 8, 9.

To fix ideas, it should be specified that the potential to which resistor 9 is taken is generally −48V, and that the value of the feed resistances may advantageously be 200 ohms, each, but it is precisely one of the advantages of the invention to be able to adapt values of feed resistances in a wide range. The feed bridge of the electronic feeding bridge since it is, in fact, question of this, is in addition particularly inexpensive, highly robust and of small dimensions.

As far as the negative impedance proper is concerned, it may be made, in known manner, from a transistor or an operational amplifier for example.

In the preferred embodiment of the junctor of the invention, corresponding to the diagram of FIG. 1, a negative impedance with operational amplifier has been adopted, illustrated in FIG. 4.

An amplifier 20 has a positive input 21 connected to a resistor 22 and a capacitor 23, forming a time constant circuit arranged to prevent squealing, and a negative input 24. The resistor 22 is connected to the output 25 of the amplifier by a resistor 26. The output 25 of the amplifier is connected by a bridge of three resistors 27–29 to a source of bias. The negative input 24 and the output 25 of the amplifier are joined by the resistor 27. The winding 3 of the transformer is connected, by one end, to the positive input 21 of the amplifier 20 via the resistor 22, and, by the other end, to earth, via a capacitor 30, connected between resistors 28, 29. A disabling line 31 is connected to the positive input 21 of the amplifier to avoid oscillations when the line 5, 6 is open at both ends.

It is clear that the application of the negative impedance according to the invention must not be considered as being limited to a electronic feeding bridge of a unit automatic exchange, and that this negative impedance may be used wherever the solution to the problem at the origin of the present invention must be adopted. The main interest of the invention nonetheless resides in time-division unit automatic exchanges and especially in space-division unit automatic exchanges in which the switching network is a simple switch and in which the feed bridge must be of high impedance at audio frequencies.

What is claimed is:

1. An electronic feeding bridge for a switching network, comprising: a pair of two wires adapted to be connected on the one hand to a sub set, on the other hand to the two ends of a first winding of a transformer via at least one capacitor connected between one of the ends of said first winding and the associated wire of said pair, the transformer comprising a second winding connected to said switching network and the two wires of said pair being respectively connected to two feed resistors, one taken to earth, the other to a feed potential, a third winding to which a negative impedance circuit is connected, so as to cooperate, in alternating current, with the feed resistors and thus to present in parallel on said pair of wires, toward the sub set with respect to the capacitor, an impedance greater than that of the two feed resistors connected in series, and a disabling line connected to said negative impedance circuit such that oscillations are avoided across said sub set when lines connected to said sub set are open.

2. An electronic feeding bridge for a switching network as claimed in claim 1, wherein the second winding has a centre point, and it is connected, by its ends, to said switching network by two amplifiers and, by its centre point, to a balancing impedance.

3. An electronic feeding bridge for a switching network as claimed in claim 1, wherein the negative impedance is an impedance with an operational amplifier.

4. An electronic feeding bridge for a switching network as claimed in claim 3, wherein said disabling line is connected to the positive imput of said amplifier.

* * * * *